United States Patent
Yu

(10) Patent No.: US 7,461,301 B2
(45) Date of Patent: *Dec. 2, 2008

(54) APPROACH FOR RESOLVING PRINTER DRIVER INCOMPATIBILITY PROBLEMS

(75) Inventor: Zhongming Yu, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 11/367,876

(22) Filed: Mar. 2, 2006

(65) Prior Publication Data

US 2006/0156071 A1 Jul. 13, 2006

Related U.S. Application Data

(63) Continuation of application No. 10/401,960, filed on Mar. 27, 2003, now Pat. No. 7,036,047.

(51) Int. Cl.
*G06F 11/00* (2006.01)

(52) U.S. Cl. ............... 714/44; 719/321; 358/1.14
(58) Field of Classification Search ............. None
See application file for complete search history.

(56) References Cited

U.S. PATENT DOCUMENTS

| | | | | |
|---|---|---|---|---|
| 5,995,723 A * | 11/1999 | Sperry et al. | ............... | 358/1.15 |
| 6,154,208 A * | 11/2000 | Otala | ............... | 715/866 |
| 6,430,321 B1 * | 8/2002 | Choo | ............... | 382/299 |
| 6,515,758 B2 * | 2/2003 | Uda et al. | ............... | 358/1.15 |
| 6,661,526 B1 * | 12/2003 | Daly et al. | ............... | 358/1.13 |
| 7,031,019 B1 * | 4/2006 | Sakurai | ............... | 358/1.9 |
| 7,047,528 B2 * | 5/2006 | Iida | ............... | 717/170 |
| 7,149,826 B2 * | 12/2006 | Howard | ............... | 710/62 |
| 7,161,711 B2 * | 1/2007 | Mori et al. | ............... | 358/1.9 |
| 2002/0120792 A1 * | 8/2002 | Blair et al. | ............... | 709/330 |
| 2002/0163665 A1 * | 11/2002 | Iwata et al. | ............... | 358/1.15 |
| 2003/0090694 A1 * | 5/2003 | Kennedy et al. | ............... | 358/1.13 |
| 2003/0103081 A1 * | 6/2003 | Ebuchi | ............... | 345/764 |
| 2003/0137689 A1 * | 7/2003 | Bontempi | ............... | 358/1.15 |
| 2003/0142337 A1 * | 7/2003 | Kizaki et al. | ............... | 358/1.13 |
| 2003/0179401 A1 * | 9/2003 | Robertson | ............... | 358/1.14 |
| 2004/0085572 A1 * | 5/2004 | Gomez | ............... | 358/1.15 |
| 2004/0095597 A1 * | 5/2004 | Lin | ............... | 358/1.15 |
| 2004/0130741 A1 * | 7/2004 | Ferlitsch | ............... | 358/1.13 |
| 2004/0136023 A1 * | 7/2004 | Sato | ............... | 358/1.13 |

\* cited by examiner

*Primary Examiner*—Gabriel L Chu
(74) *Attorney, Agent, or Firm*—Hickman Palermo Truong & Becker LLP

(57) ABSTRACT

A manner of resolving printer driver incompatibility problems is described. Print data is received from a printer driver. The print data reflects an incompatibility between the application program used to create the print data and the printer driver. Next, updated print data is generated that corrects the incompatibility between an application program and the printer driver. Thereafter, the updated print data is sent to the printer. The electronic document is printable by the printer such that the printed copy does not reflect the incompatibility between an application program and a printer driver.

35 Claims, 5 Drawing Sheets

400

APPROACH FOR RESOLVING PRINTER DRIVER INCOMPATIBILITY PROBLEMS

RELATED APPLICATION AND CLAIM OF PRIORITY

This application is a continuation application of and claims priority to U.S. patent application Ser. No. 10/401,960, filed Mar. 27, 2003 now U.S. Pat. No. 7,036,047, entitled "APPROACH FOR RESOLVING PRINTER DRIVER INCOMPATIBILITY PROBLEMS," the contents of which is hereby incorporated herein by reference in its entirety for all purposes as if fully set forth herein.

FIELD OF THE INVENTION

The present invention generally relates to the field of electronic publishing, and more particularly, to an approach for resolving printer driver incompatibility problems.

BACKGROUND OF THE INVENTION

The use of documents in an electronic format (electronic documents) has become increasingly popular for a variety of reasons. First, electronic documents provide a convenient format for storing information because electronic documents may be easily shared with others and do not degrade over time. Second, the types of documents that may be stored electronically have grown with the expanding field of application programs. Third, documents stored electronically lend themselves to be stored more cheaply and efficiently in the aggregate than traditional physical storage.

Electronic documents are typically printed by issuing a print command to a printer driver. While the print command may originate from any programming entity, the print command typically originates from an application program responsible for rendering the electronic document. The printer driver receiving the print command acts like a translator between a printer and the programming entity that issued the print command. For example, a printer driver accepts generic commands from an application program, e.g., a text editor, and translates the generic commands into specialized commands understood by the printer to enable to printer to print the electronic document. A portion of the generic commands that a printer driver may accept from the application program includes specification data. Specification data is data that indicates how the electronic document is to be printed by a user.

Different versions of the application program issuing a print command and the printer driver receiving the print command may exist. For example, a manufacturer may periodically make new versions of application programs or printer drivers available. While a specific version of an application program may function as expected with a specific version of a printer driver, other combinations of versions of application programs and printer drivers may introduce an incompatibility between the application program and the printer driver. Specifically, the printer driver may be a newer than the application program, and the version of the printer driver may not be backward compatible with the version of the application program. Additionally, the application program may be newer than the printer driver, and the version of the application program may not be backward compatible with the version of the printer driver.

The incompatibility between the application program and the printer driver may result in the printing of the electronic document in an undesirable fashion. Certain features or capabilities supported by the application program or printer driver may result in the electronic document to be printed improperly due to the incompatibility. For example, the application program may support a feature to print an electronic document with a border or a watermark, but the version of the printer driver being employed may not support a feature supported by the application program, resulting in a printed copy of the electronic document that differs from the electronic document rendered by the application program, e.g., the border or watermark does not appear properly.

Current approaches attempt to address these problems are not satisfactory. A user encountering incompatibility problems may attempt to modify the original electronic document for purposes of working around the incompatibility. However, this solution is far from complete, as modifying the electronic document to work around the incompatibility may not be possible. Even if it is possible to modify the electronic document to work around the incompatibility, the modification of the electronic document both risks damaging the integrity of the original electronic document and results in wasted time and frustration for the user.

Additionally, a user may attempt to obtain a version of the application program or printer driver that does not introduce the incompatibility. However, such a version of the application program or printer driver may not be available or supported. Moreover, obtaining the latest version of a printer driver or application program may require purchase of the new release. Such a purchase requires additional monetary expense and time for installation, which is undesirable. Accordingly, there is an unaddressed need in the art to resolving printer driver incompatibility problems while avoiding the problems associated with the prior approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

According to one aspect of the invention, an approach is provided for processing print data to resolve printer driver incompatibility problems. According to the approach, if configuration data indicates that an incompatibility between an application program and a printer driver is to be corrected, then print data is received from a printer driver, wherein the print data reflects the incompatibility between the application program used to create the print data and the printer driver. Next, updated print data is generated that corrects the incompatibility between an application program and the printer driver. Thereafter, the updated print data is sent to the printer. The electronic document is printable by the print such that the printed copy does not reflect the incompatibility between an application program and a printer driver.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and mechanism for resolving printer driver incompatibility problems is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Various aspects of the invention are described hereinafter in the following sections:

I. Architecture Overview

II. Functional Overview

III. Printing an Electronic Document to Multiple Output Mechanisms

IV. Implementing Mechanisms

I. Architecture Overview

Figure 1:
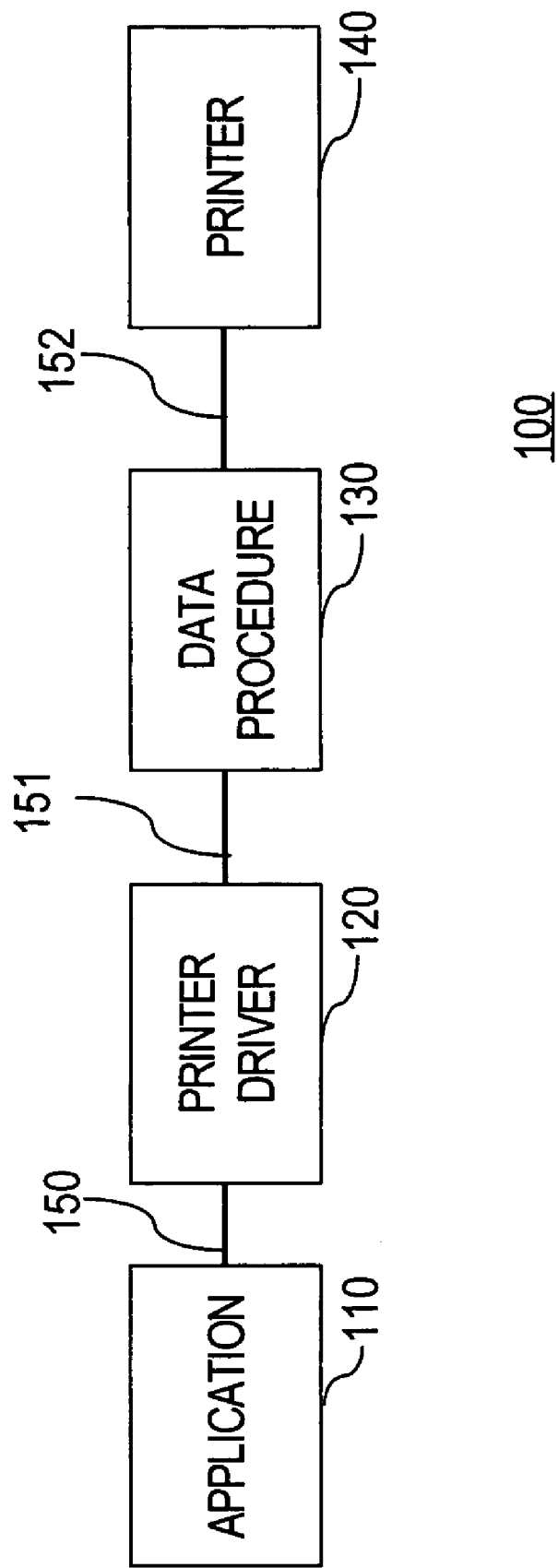
FIG. 1 is a block network diagram that depicts a printing system according to an embodiment of the invention.

FIG. 1 is a block network diagram illustrating a printing system 100 configured according to an embodiment of the invention. Printing system 100 may be used to resolve printer driver incompatibility problems. Printing system 100 includes an application 110, a printer driver 120, a data procedure 130, a printer 140, and communications links 150, 151, and 152.

Application 110, as broadly used herein, is any processing entity, such as an application program, capable of issuing a print command. For example, application 110 may be an application program that is capable of rendering an electronic document or capable of performing file management functionality. While only one application 110 is displayed in FIG. 1 to provide a clear example, printing system 100 may include any number of applications 110.

Printer driver 120 is a computerized device or program that is configured to issue a command to printer 140 to initiate printing of an electronic document. Printer driver 120 receives specification data from application 110. Specification data is data that indicates how an electronic document is to be printed by a user. Printer driver 120 processes the specification data to produce print data. The print data is data that indicates how an electronic document is to be printed. While only one printer driver 120 is displayed in FIG. 1 to provide a clear example, printing system 100 may include any number of printer drivers 120.

Figure 2:
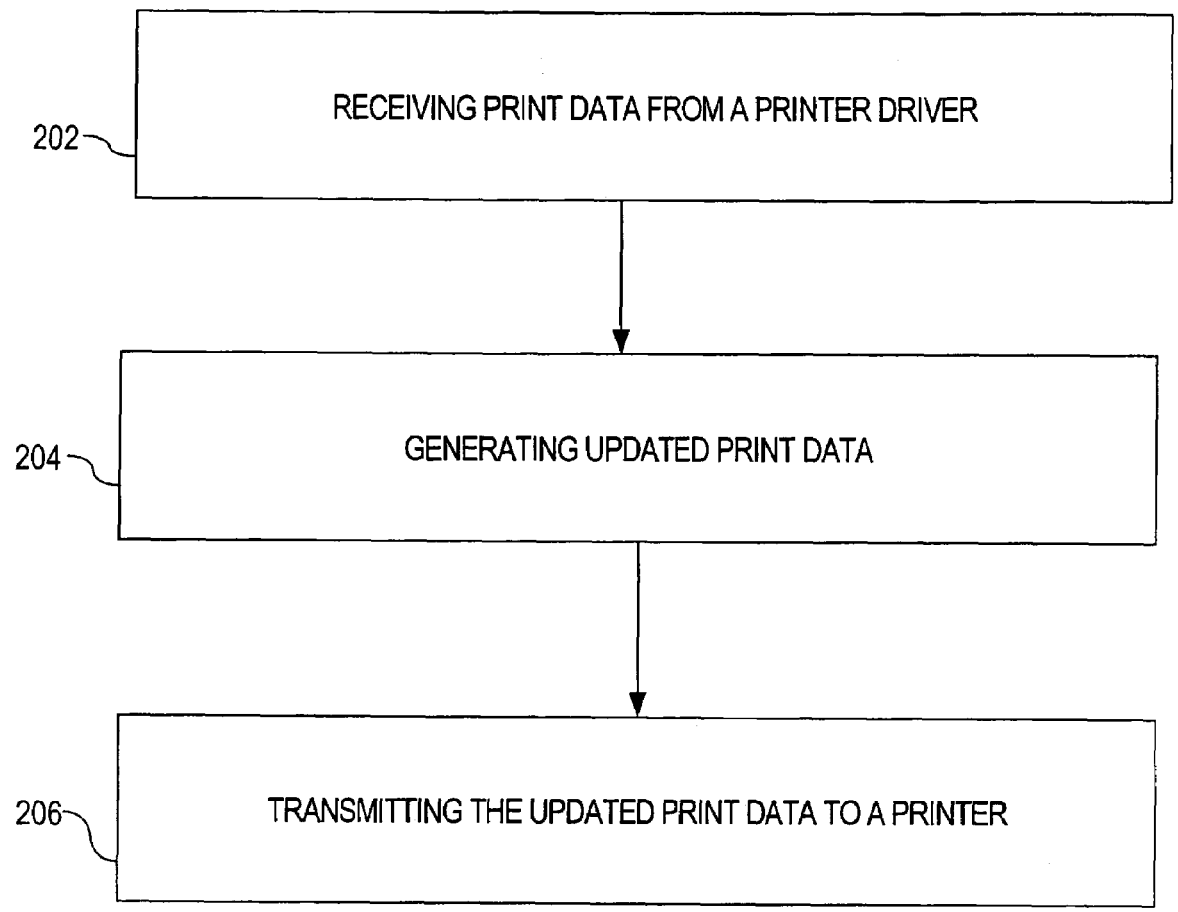
FIG. 2 is a flow-chart that depicts the high-level functional steps of processing print data according to an embodiment of the invention.

Data procedure 130 is any processing entity that is configured to perform the steps illustrated in FIG. 2. Data procedure 130 may be embodied in hardware, software, or any combination of hardware and software. Data procedure 130 processes print data to determine if the print data reflects any incompatibilities between application 110 and a printer driver 120. If the print data reflects any incompatibilities between application 110 and a printer driver 120, then data procedure 130 generates updated print data and transmits the updated print data to printer 140. The updated print data is print data that corrects an incompatibility between application 110 and a printer driver 120.

In an embodiment, data procedure 130 may be implemented as a functional component of printer driver 120. In another embodiment, such as the one depicted in FIG. 1, data procedure 130 may be separate from but operationally connected to printer driver 120. While only one data procedure 130 is displayed in FIG. 1 to provide a clear example, printing system 100 may include any number of data procedures 130.

Printer 140 is broadly used to describe any potential entity that is configured to print physical copies of electronic documents. Non-limiting, illustrative examples of printer 140 include a single bin printer, a multiple bin printer, and a facsimile machine. While only one printer 140 is displayed in FIG. 1 to provide a clear example, printing system 100 may include any number of printers 140.

Communications links 150-152 may be implemented by any medium or mechanism that provides for the exchange of data between application 110, printer driver 120, data procedure 130, and printer 140. Examples of communications links 150-152 include, without limitation, a network such as a Local Area Network (LAN), Wide Area Network (WAN), Ethernet or the Internet, one or more terrestrial, satellite or wireless links, and serial or parallel printer cables.

II. Functional Overview

FIG. 2 is a flow-chart 200 that depicts the high-level functional steps of processing print data to resolve printer driver incompatibility problems according to an embodiment of the invention. In step 202, print specification data is received from a printer driver. The print data reflects an incompatibility between an application program used to create the print data and the printer driver. In step 204, updated print data is generated. The updated print data corrects the incompatibility between an application program and the printer driver. In step 206, the updated print data is transmitted to a printer. Thereafter, the printer may print the electronic document specified in the updated print data despite the incompatibility.

III. Printing an Electronic Document to Multiple Output Mechanisms

The processing of print data is now be described in further detail with reference to flow-chart 300 of FIG. 3. In step 302, a determination is made as to whether the processing of print data originating from application 110 is desired. In an embodiment, printer driver 120 performs step 302 by consulting configuration data. Configuration data is data that records the preference of a user regarding the operation of printing system 100.

Figure 4:
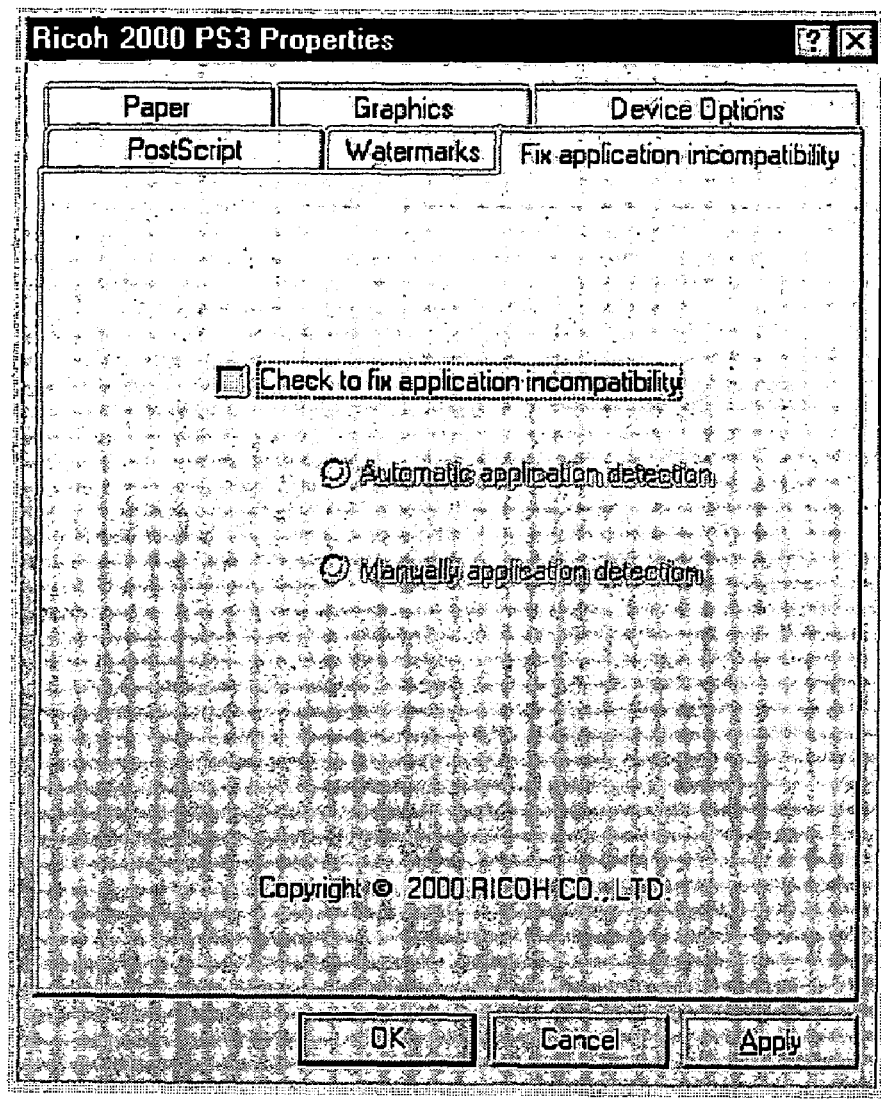
FIG. 4 is a graphical depiction of a graphical user interface through which a user may configure configuration data according to an embodiment of the invention.

Configuration data may be configured by a user through a graphical user interface ("GUI"), such as GUI 400 displayed in FIG. 4. In an embodiment, GUI 400 is displayed to a user each time a user prints an electronic document by printer driver 120. In another embodiment, GUI 400 is accessible by a user at any time, e.g., at a time not contemporaneous with the printing of an electronic document. For example, in such an embodiment, GUI 400 is presented to the user through any mechanism in which a user typically configures the operation of a printer driver, e.g., the "Printer Setup" screen of an operating system.

A user may configure configuration data to store a set of default settings, e.g., when a user accesses GUI 400 when the user is not printing an electronic document. When a user accesses GUI 400 when the user is printing an electronic document, default settings for the user may be displayed on GUI 400. The user may either accept the default settings via GUI 400, or may configure the configuration data through the GUI 400 in a manner that differs from the default settings for the particular electronic document currently being printed.

If the determination of step 302 is negative, then processing ends at step 304. In step 304, printing system 100 does not resolve printer driver incompatibility problems. Accordingly, print data is transmitted directly from printer driver 120 to printer 140 for purposes of printing an electronic document as specified in the print data.

If the determination of step 302 is positive, processing proceeds to step 306. In step 306, a determination is made as to whether automatic detection of the identity of application 110 is desired. In an embodiment, the user may configure configuration data to identify whether automatic detection of the identity of application 110 is desired through GUI 400. For example, GUI 400 may display a mechanism, such as the radio buttons displayed on GUI 400 in FIG. 4, which allows a user to identify whether automatic detection of the identity of application 110 is desired.

If the determination of step 306 is negative, then in step 308, the user manually identifies application 100. In an embodiment, GUI 400 provides a mechanism in which the identity of application 110 may be identified by the user and subsequently stored in configuration data, such as, e.g., a pull down list box or a text field. After the user manually identifies the identity of application 110, the identity of application 110 is stored in configuration data. After step 308 is completed, processing proceeds to step 312.

If the determination of step 306 is positive, then printer driver 120 automatically identifies application 100 in step 310. Printer driver 120 may employ a variety of means to detect the identity of application 110, including but not limited to consulting data stored in memory and consulting the file name extension of the electronic document being printed. For example, in an embodiment, printer driver 120 may determine that any electronic document with a file name extension of ".doc" was printed from Microsoft Word®, available from Microsoft Corporation, located in Redmond, Wash., determine that any electronic document with a file name extension of ".pdf" was printed from Adobe Acrobat®, available from Adobe Systems Incorporated, located in San Jose, Calif., and determine that any electronic document with a file name of ".xls" was printed from Microsoft Excel®, available from Microsoft Corporation, located in Redmond, Wash. After printer driver 120 automatically detects the identity of application 110, the identity of application 110 is stored in configuration data. After step 310 is completed, processing proceeds to step 312.

In step 312, print data is received from printer driver 120 by data procedure 130. The print data reflects an incompatibility between an application 110 and printer driver 120. The incompatibility may arise from one or more print codes that reside within the print data, wherein the one or more print codes are supported by application 110, but not supported by printer driver 120, or wherein the one or more print codes are supported by the printer driver 120, but not supported by application 110.

A print code is a subset of print data that specifies how to print one aspect of an electronic document. In other words, print data is comprised of a plurality of print codes. For example, each line below of a portion of print data is itself a print code:
%% EndPageSetup
%%% Mirror image feature
1000 0 translate
clpr storerect left bottom width height rectclip The above lines of print code are intended to print a mirror image of an electronic document when processed by a printer. In this example, however, the above lines of print code contain an incompatibility between an application 110 and printer driver 120, and a printer 140 receiving the print data containing the above print codes would not print the electronic document in the intended "mirror image" format.

In an embodiment, data procedure 130 may receive the print data in step 312 by reading the print data from a temporary file stored in volatile or non-volatile memory. In another embodiment, data procedure 130 may receive the print data in step 312 over communications link 152.

In step 314, updated print data is generated by data procedure 130. In an embodiment, data procedure 130 performs application specific processing upon the print data received in step 312. In other words, the particular processing steps performed by data procedure 130 upon the print data in step 314 is dependent upon the identity of the processing entity that issued the print command associated with the print data, namely application 110. Data procedure 130 determines the identity of application 110 by consulting configuration data, which recorded the identity of application 110 in either step 308 or step 310.

When an incompatibility between an application 110 and printer driver 120 is identified, those skilled in the art of printer drivers are able to resolve the incompatibility by adding or subtracting one or more print codes within the preexisting print data. For example, in the above example involving the printing of a mirror image of an electronic document, the problem may be resolved by replacing the above print codes with the following print codes:
%% EndPageSetup
%%% Mirror image feature
4000 0 translate
−1 1 scale
clpr storerect left bottom width height rectclip An administrator may configure data procedure 130 to generate updated print data for any incompatibility known to exist for a particular application 110. Thus, any incompatibility known to exist for a particular application 110 may have a corresponding set of procedures configured by an administrator in data procedure 130 to resolve or fix the incompatibility. An administrator configures data procedure 130 to add or subtract a set of print code to resolve the problem when the incompatibility is detected by data procedure 130. For example, in the above example of printing a mirror image of an electronic document, an administrator would configure data procedure 130 to check any print data associated with application 110 for the presence of the mirror image feature, and if so, modify the print codes contained therein as illustrated above.

Data procedure 130 determines what features or characteristics of the electronic document are to be printed. In an embodiment, data procedure 130 determines what features or characteristics of the electronic document are to be printed by consulting the configuration data. Printer driver 120 may record the features or characteristics of the electronic document are to be printed in the configuration data contemporaneous with the creation of the print data by printer driver 120. In another embodiment, data procedure 130 may determine what features or characteristics of the electronic document are to be printed by consulting the print data itself to determine its composition.

Once data procedure 130 determines the identity of application 110 by consulting configuration data, data procedure 130 performs any fixes upon the print data that have been identified for the features or characteristics of the electronic document identified in the print data. As multiple incompatibilities may be identified for a particular application, data procedure 130 may perform multiple fixes for each application 110. Each fix may itself require the addition or subtraction of multiple print codes to resolve the incompatibility associated with the fix. Thus, the step of generating the updated print data may include removing a subset of the print data to create the updated print data, adding additional print data to create the updated print data, or both.

In step 316, the updated print data is transmitted to printer 140. Printer 140 prints a physical copy of the electronic document as specified in the updated print data that does not reflect the incompatibility, having not received the print data that reflects the incompatibility.

In an embodiment, printing system 100 processes print data on a per electronic document basis. In other words, printing system 100 processes print data each time an electronic document is printed, even if the same electronic document is printed multiple times.

Figure 3:
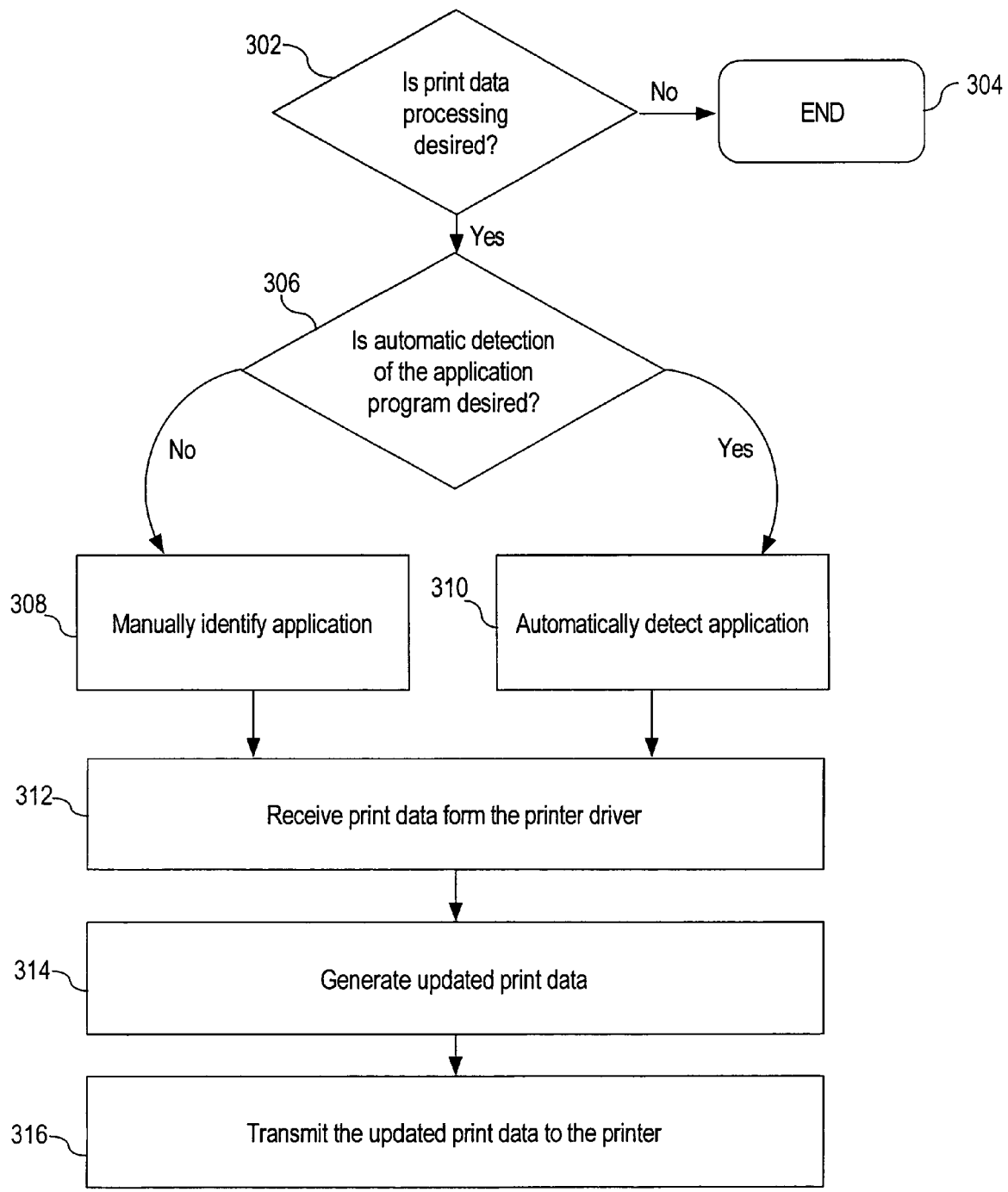
FIG. 3 is a flow-chart that depicts the functional steps of processing print data according to an embodiment of the invention.

Although flow-charts 200, 300 depict a particular set of steps in a particular order, other implementations may use fewer or more steps, in the same or different order, than those depicted in FIGS. 2 and 3.

IV. Implementing Mechanisms

Figure 5:
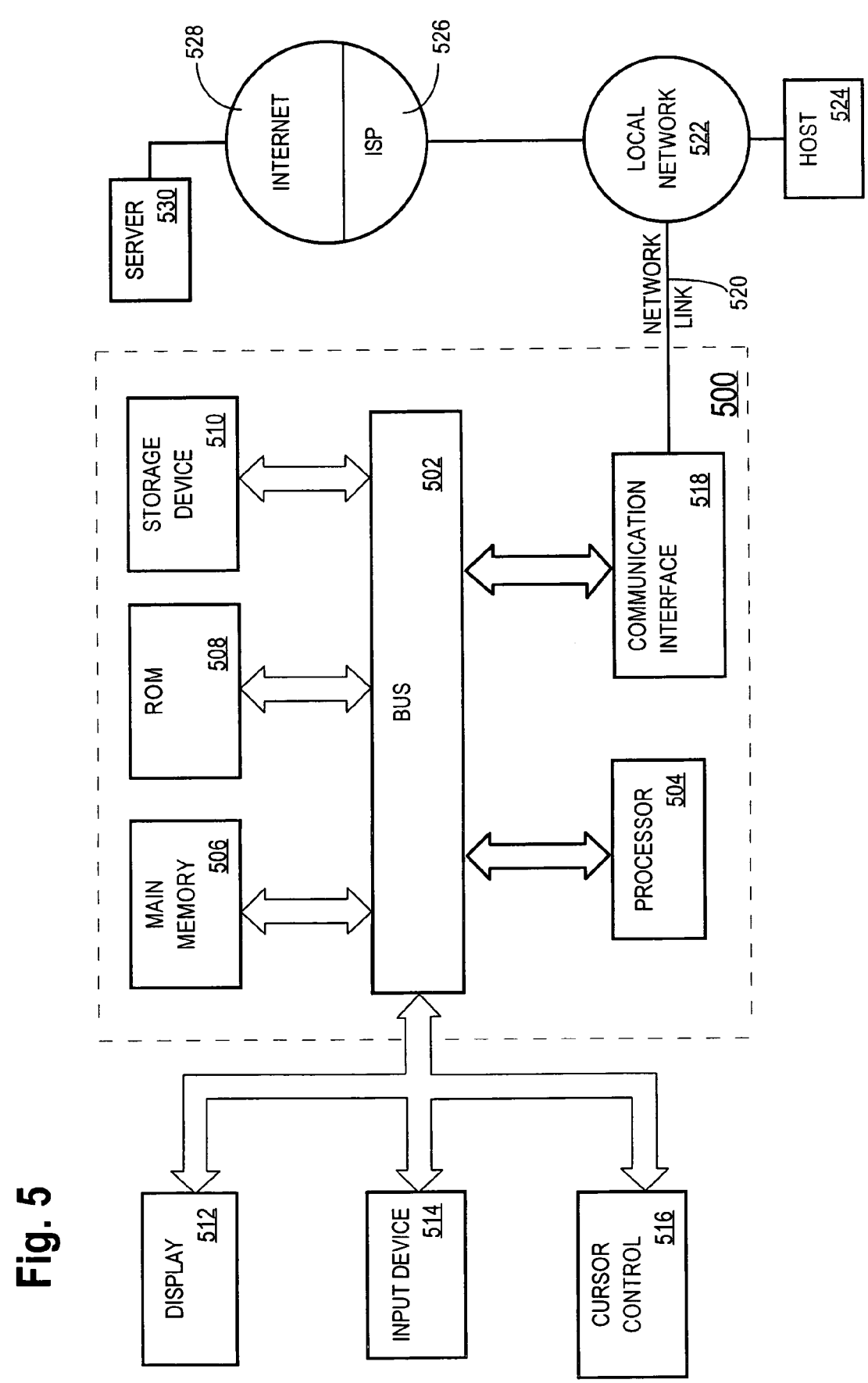
FIG. 5 is a block diagram that depicts a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for processing print data. According to one embodiment of the invention, processing print data is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for processing print data as described herein.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for processing print data, comprising:
   receiving print data from a printer driver,
   wherein, when the print data reflects an incompatibility between an application program and the printer driver,
   generating updated print data that corrects the incompatibility between the application program and the printer driver, including
      identifying the application program, wherein the updated print data is generated using application specific processing applied for the identified application program; and
   transmitting the updated print data to the printer.

2. The machine-implemented method of claim 1, wherein generating the updated print data includes identifying the application program, and wherein identifying the application program is performed manually by a user.

3. The machine-implemented method of claim 1, wherein generating the updated print data includes identifying the application program, and wherein identifying the application program is performed by the printer driver.

4. The machine-implemented method of claim 1, wherein the incompatibility between the application program and the printer driver arises from the application being a version that is more recent than a version of the application that is supported by the printer driver.

5. The machine-implemented method of claim 1, wherein the incompatibility between the application and the printer driver arises from the printer driver being a version that is more recent than a version of the printer driver that is supported by the application.

6. The machine-implemented method of claim 1, wherein the incompatibility arises from one or more print codes that reside within the print data, and wherein the one or more print codes are supported by the application program, but not supported by the printer driver.

7. The machine-implemented method of claim 1, wherein the incompatibility arises from one or more print codes that reside within the print data, and wherein the one or more print codes are supported by the printer driver, but not supported by the application program.

8. The machine-implemented method of claim 1, wherein generating the updated print data includes removing a subset of the print data from the print data.

9. The machine-implemented method of claim 1, wherein generating the updated print data includes adding additional print data to the print data.

10. The apparatus of claim 1, further comprising:
    testing the print data for an incompatibility between an application program and the printer driver.

11. A machine-readable medium storing one or more instructions for processing print data, wherein execution of the one or more sequences of instructions by one or more processors causes the one or more processors to perform:
    receiving print data from a printer driver,
    wherein, when the print data reflects an incompatibility between an application program and the printer driver,
    generating updated print data that corrects the incompatibility between the application program and the printer driver, including
       identifying the application program, wherein the updated print data is generated using application specific processing applied for the identified application program; and
    transmitting the updated print data to the printer.

12. The machine-readable medium of claim 11, wherein generating the updated print data includes identifying the application program, and wherein identifying the application program is performed manually by a user.

13. The machine-readable medium of claim 11, wherein generating the updated print data includes identifying the application program, and wherein identifying the application program is performed by the printer driver.

14. The machine-readable medium of claim 11, wherein the incompatibility between the application program and the printer driver arises from the application being a version that is more recent than a version of the application that is supported by the printer driver.

15. The machine -readable medium of claim 11, wherein the incompatibility between the application and the printer driver arises from the printer driver being a version that is more recent than a version of the printer driver that is supported by the application.

16. The machine -readable medium of claim 11, wherein the incompatibility arises from one or more print codes that reside within the print data, and wherein the one or more print codes are supported by the application program, but not supported by the printer driver.

17. The machine-readable medium of claim 11, wherein the incompatibility arises from one or more print codes that reside within the print data, and wherein the one or more print codes are supported by the printer driver, but not supported by the application program.

18. The machine-readable medium of claim 11, wherein generating the updated print data includes removing a subset of the print data from the print data.

19. The machine-readable medium of claim 11, wherein generating the updated print data includes adding additional print data to the print data.

20. An apparatus for processing print data, comprising:
    a processor; and
    a machine-readable medium accessible to the processor and comprising one or more sequences of instructions which, when executed by the processor, causes:
       receiving print data from a printer driver, wherein, when the print data reflects an incompatibility between an application program and the printer driver, generating updated print data that corrects the incompatibility between the application program and the printer driver, including identifying the application program, wherein the updated print data is generated using application specific processing applied for the identified application program; and transmitting the updated print data to the printer.

21. The apparatus of claim 20, wherein generating the updated print data includes identifying the application program, and wherein the step of identifying the application program is performed manually by a user.

22. The apparatus of claim 20, wherein generating the updated print data includes identifying the application program, and wherein identifying the application program is performed by the printer driver.

23. The apparatus of claim 20, wherein the incompatibility between the application program and the printer driver arises from the application being a version that is more recent than a version of the application that is supported by the printer driver.

24. The apparatus of claim 20, wherein the incompatibility between the application and the printer driver arises from the printer driver being a version that is more recent than a version of the printer driver that is supported by the application.

25. The apparatus of claim 20, wherein the incompatibility arises from one or more print codes that reside within the print data, and wherein the one or more print codes are supported by the application program, but not supported by the printer driver.

26. The apparatus of claim 20, wherein the incompatibility arises from one or more print codes that reside within the print data, and wherein the one or more print codes are supported by the printer driver, but not supported by the application program.

27. The apparatus of claim 20, wherein generating the updated print data includes removing a subset of the print data from the print data.

28. The apparatus of claim 20, wherein generating the updated print data includes adding additional print data to the print data.

29. A printing device, comprising:

an application capable of issuing a print command to a printer;

a printer driver, connected at least to the application and the printer, comprising a computerized device or program that is configured to issue a command to the printer to initiate printing of an electronic document;

a data procedure for processing print data to determine if print data received from the printer driver reflects any incompatibilities between the application and the printer driver; and a plurality of communications links connecting all of the above;

wherein the data procedure is responsible for:

generating updated print data that, if necessary, corrects an incompatibility between the application program and the printer driver, including identifying the application program; wherein the updated print data is generated using application specific processing applied for the identified application program; and transmitting the updated print data to the printer.

30. The printing device of claim 29, further comprising:
wherein the application is capable of rendering the electronic document.

31. The printing device of claim 29, further comprising:
wherein the printer driver receives specification data from the application.

32. The printing device of claim 31, further comprising:
wherein the specification data indicates how the electronic document is to be printed by a user.

33. The printing device of claim 31, further comprising:
wherein the printer driver processes the specification data to produce the print data.

34. The printing device of claim 33, further comprising:
wherein the print data indicates how the electronic document is to be printed and reflects the incompatibilities between the application and the printer driver.

35. The printing device of claim 29 further comprising:
wherein the incompatibility arises from one or more print codes that reside within the print data and are supported by the application, but not supported by the printer driver, or vice versa.

* * * * *